(12) United States Patent
Edvardsson

(10) Patent No.: US 7,486,226 B2
(45) Date of Patent: Feb. 3, 2009

(54) DEVICE AND A METHOD FOR ACCURATE RADAR LEVEL GAUGING

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 11/516,845

(22) Filed: Sep. 7, 2006

(65) Prior Publication Data
US 2008/0062037 A1    Mar. 13, 2008

(51) Int. Cl.
G01S 13/08    (2006.01)
H01Q 15/14    (2006.01)
H01Q 15/24    (2006.01)
G01F 23/284   (2006.01)
G01S 13/10    (2006.01)
G01S 13/74    (2006.01)
G01S 13/00    (2006.01)

(52) U.S. Cl. .............. 342/118; 342/5; 342/6; 342/42; 342/43; 342/51; 342/124; 342/125; 342/134; 342/135; 342/159; 342/175; 342/188; 342/195; 324/600; 324/629; 324/637; 324/642; 324/644

(58) Field of Classification Search .......... 342/27–51, 342/82, 89–103, 118–145, 175, 195, 5–11, 342/159–174, 188–194, 196, 197; 73/290 R, 73/304 R, 304 C, 305–322.5; 324/600, 629, 324/637, 642, 644
See application file for complete search history.

(56) References Cited

U.S. PATENT DOCUMENTS 2,248,215 A * 7/1941 Budenbom ........... 342/125
2,301,929 A * 11/1942 Budenbom ........... 342/121
2,540,076 A * 2/1951 Dicke ............... 342/120
2,604,621 A * 7/1952 Earp et al. .......... 342/121

(Continued)

FOREIGN PATENT DOCUMENTS

RU    2 176 382 C1    11/2001

OTHER PUBLICATIONS

"Antenna Polarization Considerations in Wireless Communications Systems"; no author listed; Cushcraft Corporation; Manchester, New Hapshire; no date given; copyright 1999-2002.*

Primary Examiner—Bernarr E Gregory
(74) Attorney, Agent, or Firm—Westman, Champlin & Kelly, P.A.

(57) ABSTRACT

The invention relates to a system, device, and method for using radar signals to measure the distance (h) to a surface from said device, the device comprising a transmitter and a transmitting antenna for transmitting radar signals, and a receiver and a receiving antenna for receiving a radar signal. The device may also comprise a first additional reflecting object separate from the receiving antenna, which additional reflector is designed so as to introduce a first predetermined alteration in radar signals upon reflection, with the device being equipped with means to differ between received signals with and without said predetermined alteration. The first predetermined alteration introduced by the first separate reflector can be, for example, a modulation shift or a shift in the polarization of the signal. In a typical embodiment the additional reflector is located close to the radar unit creating a double transition from radar unit to the surface.

26 Claims, 5 Drawing Sheets

U.S. PATENT DOCUMENTS

| | | | |
|---|---|---|---|
| 3,680,111 A * | 7/1972 | Killion et al. | 342/33 |
| 3,774,205 A * | 11/1973 | Smith et al. | 342/44 |
| 5,054,319 A * | 10/1991 | Fling | 73/319 |
| 5,689,265 A | 11/1997 | Otto et al. | 342/124 |
| 6,229,476 B1 * | 5/2001 | Lutke et al. | 342/124 |
| 6,353,407 B1 * | 3/2002 | Donnelly | 342/124 |
| 6,384,767 B1 * | 5/2002 | Takase et al. | 342/51 |
| 6,501,416 B1 * | 12/2002 | Backhouse et al. | 342/42 |
| 6,664,916 B1 * | 12/2003 | Stafford et al. | 342/46 |
| 7,113,125 B2 * | 9/2006 | Le Sesne | 342/124 |
| 2006/0132351 A1 * | 6/2006 | Le Sesne | 342/124 |

* cited by examiner

DEVICE AND A METHOD FOR ACCURATE RADAR LEVEL GAUGING

TECHNICAL FIELD

The invention discloses a method and a device for using radar signals to measure the distance to a surface, comprising a transmitter and a transmitting antenna for transmitting radar signals, and a receiver and a receiving antenna for receiving a radar signal.

RELATED ART

Radar level gauging is a known method for measuring the amount of, for example, a liquid in a container such as a metallic tank. As the name implies, the method comprises radar technology: radar signals are transmitted towards the surface of the matter, liquid or otherwise, to be measured, and by means of the radar signals which are reflected from said surface, the distance to the surface from the transmitting device can be determined, thus enabling an accurate calculation of the amount of matter, liquid or other, which is present in, for example, a tank.

In many applications, the transmitted signals will be reflected not only in the surface but also in objects such as bulkheads, or other objects located in the tank. These signals will interfere with the measurements, and are thus referred to as undesired signals, as opposed to the desired signals reflected from the surface. One known way of enabling suppression of undesired signals in favor of desired signals is to use a rather large bandwidth in the radar system, said bandwidth being employed to use so called range gating. If radar level gauging is to be used in non-metallic tanks, from which radar energy can leak, or even in open-air applications, the level gauging system will be subject to the same frequency and bandwidth regulations as any other system which transmits electromagnetic energy, thus making it difficult or impossible to use as much bandwidth as might be necessary in order to solve, for example, the problem of suppressing undesired signals in favour of desired signals. One example of an open-air application for radar level gauging is measurements of the water level in a dam or other bodies of water.

SUMMARY OF THE INVENTION

There is thus a need for a method and a device by means of which radar level gauging can be performed in an environment in which frequency or other transmission restrictions might apply, by means of which method or device signals that have been reflected from a surface which it is desired to measure the distance to can be suppressed in favor of signals which have been reflected from other objects.

This need is addressed by the present invention in that it discloses a device for using radar signals to measure the distance to a surface from said device, the device comprising a transmitter and a transmitting antenna for transmitting radar signals, and a receiver and a receiving antenna for receiving radar signals.

The device additionally comprises a first additional reflecting object, suitably but not necessarily separate from the receiving antenna, which additional reflector is designed so as to introduce a first predetermined alteration in radar signals upon reflection. The device of the invention is also equipped with means to differ between received signals with and without said predetermined alteration.

Suitably, the additional reflector is placed so as to receive signals which have been transmitted from the transmitting antenna and then reflected from said surface. The signals will then be received at the additional reflector, and reflected towards the surface again, from which they are then reflected towards and received at the receiving antenna.

In this way, as will become even more clear from the following detailed description, signals which have "bounced" on interfering objects can be suppressed in favor of signals which have taken the described path of transmitter—surface—additional reflector—surface—receiver. Thus in one typical embodiment the invention can be said to be characterized by a double transition between radar and the measured surface, but as will be discussed later other geometries are possible too.

The first predetermined alteration introduced by the first separate reflector can be chosen from a wide variety of suitable such alterations, but examples of suitable alterations that can be mentioned are modulation shift, polarization shift and frequency shift, i.e. a mixer arrangement. The modulation shift can be either amplitude modulation or phase modulation and the above mentioned frequency shift can be named frequency modulation. In most cases obviously some electrical circuits are used for the alteration but especially at very high frequencies (a few mm wavelength) a mechanical vibration may be used for the modulation created by some piezoelectric component or by some anyway moving object.

If the alteration chosen is some kind of modulation alteration, the separate reflector can be designed as a reflecting structure with a suitable microwave component such as a diode, with the modulation controlled by some kind of control signal. In practical implementations the active part of the reflector would be a printed circuit board with a distribution network for the rather low frequency control signal connecting the microwave active part which may be dipoles (i.e. printed wiring of a wavelength-related length) including diodes modulated by said control signal. Thus the additional reflector typically is a rather simple and low-cost part of the system.

As will be realized, the use of an additional reflector which can be a unit separate from the receiving antenna makes it possible to have the additional reflector as an "add-on", i.e. a unit which can be added only when needed, thus reducing the cost in less demanding applications.

The invention also discloses a method for carrying out the steps involved in the device described above.

BRIEF DESCRIPTION OF THE DRAWINGS

The invention will be described in more detail below, with reference to the appended drawings, in which.

EMBODIMENTS

Figure 1:
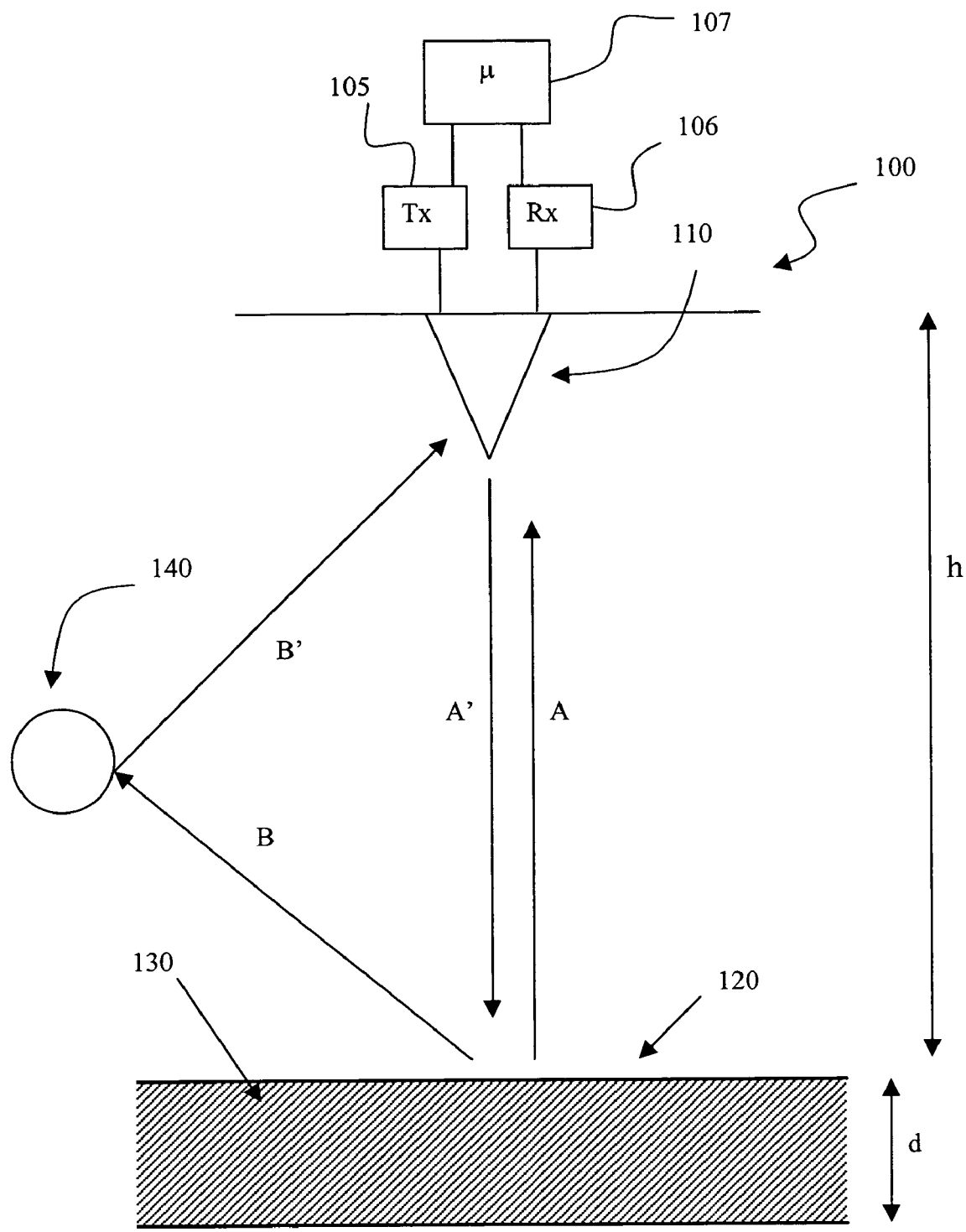
FIG. 1 shows the problem to be solved by the invention.

In FIG. 1 there is shown, in order to further facilitate the understanding of the invention and the problem to be solved, a basic radar level gauging system 100. The system comprises a transmitter 105 and transmitting antenna 110 for transmitting radar signals, and a receiver 106 and a receiving antenna 110 for receiving radar signals. Suitably, but not necessarily, the transmitter and the transmitting antenna are in fact located at the same location as the receiver and receiving antenna. In many applications, one and the same antenna 110 is used both for transmitting and receiving.

The device will also comprise additional units, such as signal processing units 107. The device is intended to measure the distance h from the device to the surface 120 of a material 130 which it might be desired to fill, for example, a metallic tank with. Examples of such materials 130 could be, for example, oil or other liquids.

By measuring the distance h to said surface 120, it will be possible to calculate how much of the material 130 which is located in the tank, or to know when to stop when filling the tank.

The measurement of the distance from the device 100 to the surface 120 is carried out by transmitting radar energy from the transmitting antenna, and then receiving reflected radar energy at the receiving antenna. The signal path which will be taken by this energy, and which it is desire to measure, is shown with arrows A-A' in FIG. 1.

However, a problem in this kind of measurements is that not all of the energy transmitted towards the surface 120 will be reflected back towards the receiving antenna, instead some of the energy will be scattered in other directions.

Due to the possible presence of interfering reflecting objects 140 in the vicinity of the surface and/or the receiving antenna, the energy which is scattered in other directions than back towards the receiving antenna might encounter such objects 140. The energy might then be reflected back towards the receiving antenna from the reflecting object, taking the path shown with arrows in FIG. 1, and denoted as A-B-B'. It will be realized that this will cause problems for the radar level gauging device, from now on referred to as RLG, as there will now be signals which have traveled two different signal paths present in the receiver.

In radar level gauges in general one typical problem is that a radar echo from a liquid surface is similar to an echo from a disturbing object such a support structure in the tank and thus hard to distinguish. Mistaking one type of echo for another or disturbing of the measurement (locally poor accuracy) are two possible problems. There are three standard methods to decrease the "range of echo competition": the antenna lobe can be made narrow, the distance resolution can be made better (narrow range gate) and various echo characteristics (amplitude, polarization etc.) can be used. A narrow antenna lobe (i.e. less space where disturbing objects are "visible") is in general always desirable but requires a big antenna and short microwave wavelength. The practical choice is however limited since the space generally is limited and the use of a high frequency may be unsuitable because of its inherent sensitivity for dirt on the antenna and foam on the surface. Some echo characteristics (at least amplitude) are always used and U.S. Pat. No. 6,759,976 is one example. Finally the range gate is closely tied to the used bandwidth and, with the practical industrial "standard", 2-3 dm is the resolution obtained by the usual 1-1.5 GHz bandwidth. With for instance the ISM-band 2.4-2.5 GHz the resolution would be only 2-3 m which would be a clear disadvantage in most applications. The "resolution" also includes the problem to distinguish the surface echo from the antenna echo if the surface is close to the antenna. Even if there are few disturbing echoes the antenna echo may be a problem and here the invention will also give a solution. The intention with the present invention is to propose a technique which is many cases is a substitute for the big bandwidth.

One solution to suppressing unwanted reflections has been to use systems with a large bandwidth, which makes it possible to use various technologies for suppressing the unwanted signals. However, if there is a need or a desire to use the RLG in applications which are not in enclosed spaces such as tanks, the RLG will need to conform to all relevant regulations regarding bandwidth etc. This might make it impossible to use the bandwidth necessary to achieve the desired suppression.

Figure 2:
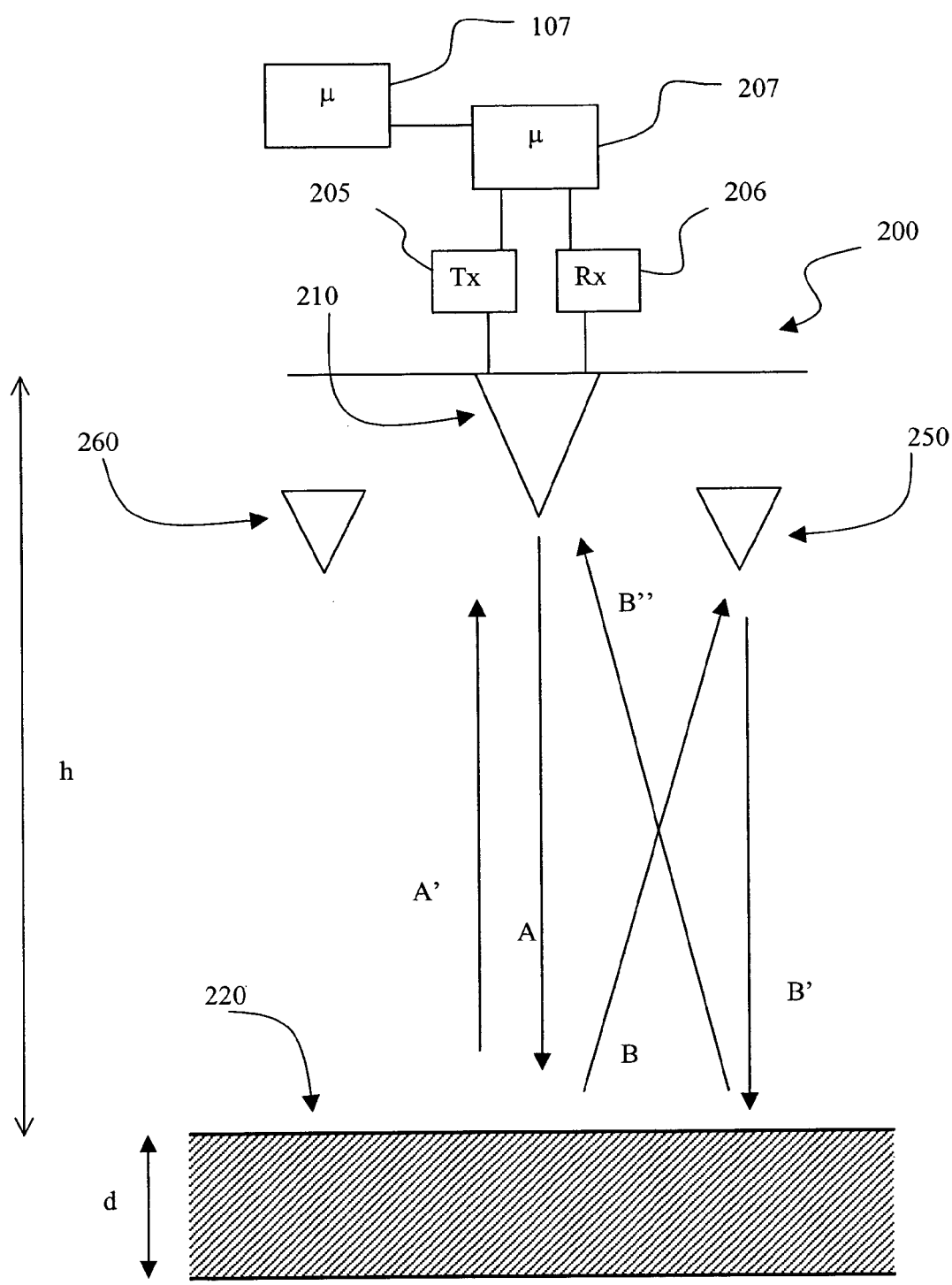
FIG. 2 shows a device according to the invention.

In FIG. 2, a device 200 according to the invention is shown, which can overcome the problem with suppression of undesired signals while using a rather limited signal bandwidth.

As with the device shown in FIG. 1, the device 200 in FIG. 2 comprises a transmitter 205 and a transmitting antenna 210 for transmitting radar signals, and a receiver 206 and a receiving antenna 210 for receiving a radar signal. Suitably but not necessarily, the transmitting antenna and the receiving antenna are arranged at the same location, and can in fact be one and the same physical unit 210. The transmitter and receiver can also be located in one and the same physical unit, suitably relatively close to the antenna/antennas.

The device 200 transmits radar signals towards the surface 220, to which it is desired to measure the distance h.

In accordance with the invention, the device 200 additionally comprises at least a first additional reflecting object, a reflector, 250, 260. Suitably but not necessarily, the additional reflector is is located separate from the receiving antenna, and is suitably a physical unit of its own. Suitably, the additional reflector is also separate from the transmitting antenna if the transmitting and receiving antennas are not one and the same physical unit. Naturally, the additional reflector can also be a part of the same structure as the receiving and/or transmitting antenna and anyway it has to be located suitably to pick up radar signals from the surface to be measured As shown in FIG. 2, radar signals which are transmitted from the device 200 will now have at least two alternative signal paths to reach the receiving antenna: first of all the signal path A-A' shown in FIG. 1, in addition to which there will also be the path A-B-B'-B", i.e. the path that is taken by signals that are first reflected on the surface 220, and the propagate towards the additional reflector 250, from which the signals are reflected towards the surface 220, and then back to the device 200.

The additional reflector 250 is, according to the invention, designed so as to introduce a first predetermined alteration in radar signals upon reflection. This means that signals which have taken the path described earlier, A-B-B'-B" and which are received in the receiver will be possible to distinguish from signals which have been reflected from interfering objects such as bulkheads etc.

The predetermined alteration which is introduced by the reflector 250 can be chosen from a wide variety of such alterations which are known to those skilled in the art, and will not be elaborated upon here. However, as examples of suitable methods of alteration, mention can be made of modulation shift or polarization shift. It is however of importance that the method of alteration chosen is one which cannot be introduced accidentally by interfering objects.

In accordance with the invention, the device 200 is equipped with means 207 to differ between received signals with and without the predetermined alteration introduced by the additional reflector 250. These means 207 can be hardware or software means, or an appropriate combination of hardware and software means. In the case of the alteration being, for example, a special modulation or modulation shift, the device will comprise suitable means for demodulation and discrimination.

Thus, the device will be able to distinguish between received signals which have the "correct signature" and other signals. This enables the device to very effectively suppress signals received from interfering objects, and to only utilize those signals which have taken the "proper" signal path, i.e. via the reflector 250, 260.

The principle has some similarities with the concept "transponder" where an aircraft etc. is fitted with a transceiver introducing a known alteration of the signal making it possible to distinguish the aircraft echo very good regardless to surrounding echoes. In the invention the "transponder" is located in the vicinity of the radar rather than at the surface we want to measure but the intention is still to suppress unwanted propagation. The "transponder" in this case is also much simpler just introducing some modulation or a polarization turning.

In one particular embodiment, the device 200 is in fact designed so as to ignore (suppress) signals which have taken the path of A-A', i.e. reflection against the additional reflector 250 is required in order for signals to be processed by the device 200. The suppression of undesired signals is also facilitated by the fact that undesired signals which are received at the device 200 will have a much lower signal strength than those having traveled the "approved" path, i.e. A-B-B'-B", due to the complicated multiple scattering usually required for undesired echoes to reach the receiving antenna.

As shown in FIG. 2, the device 200 suitably comprises two or more additional reflectors 250, 260. This is mainly in order to raise the signal strength in the signals received at the receiving antenna. Suitably, all of the additional reflectors are positioned at one and the same height h from the surface 220.

Figure 3:
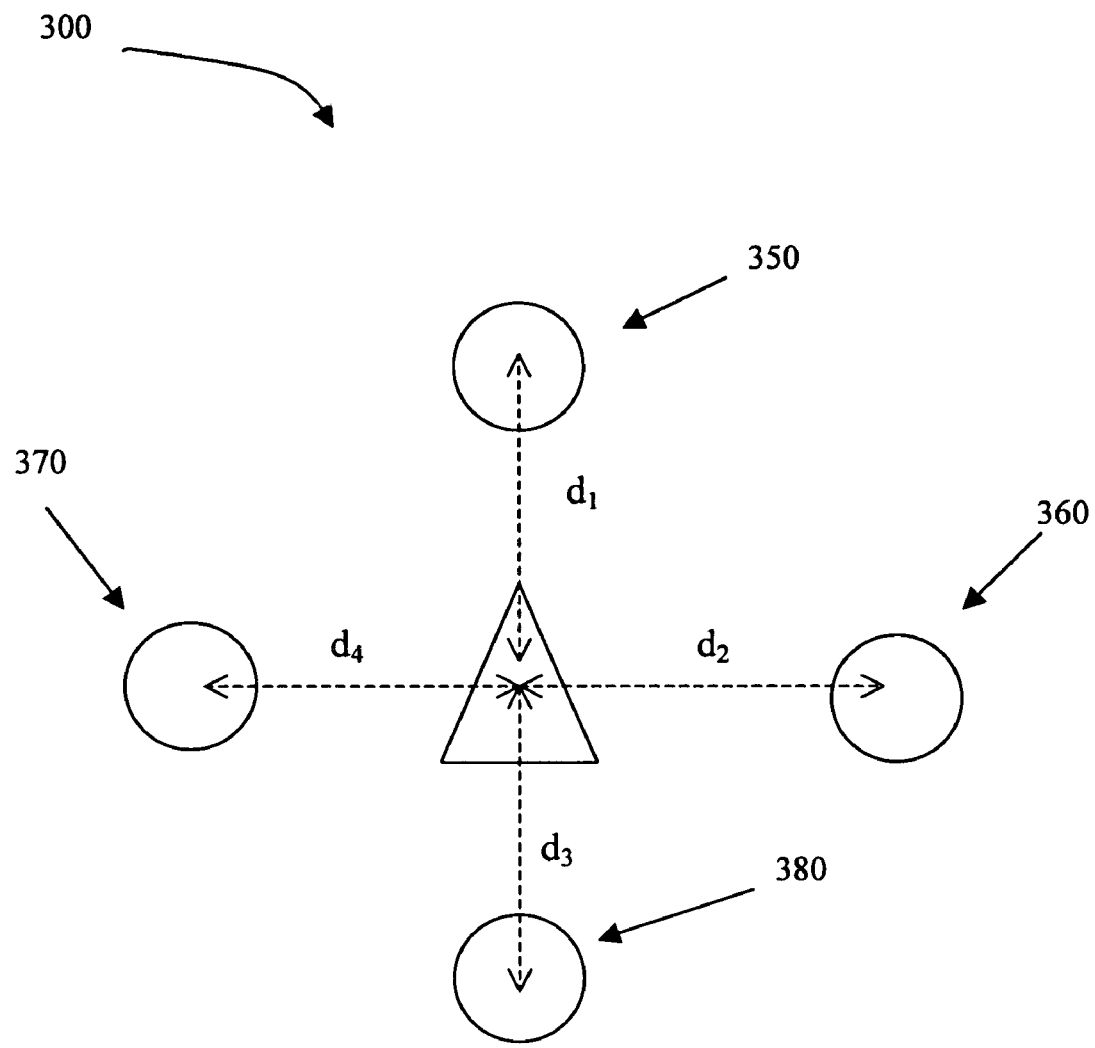
FIGS. 3 and 4 show "bottom views" of different embodiments of the invention.

FIG. 3 shows a version 300 of the device 200 on this theme, as seen from the "bottom", i.e. from the surface 220. The device 300 shown in FIG. 3 comprises four additional reflectors, 350, 360, 370, 380, all suitably but not necessarily placed symmetrically around the receiving antenna, and at the same height h from the surface 220.

The additional reflector would typically be located close to the radar unit but may at the expense of extra cabling be located somewhere close to the radar beam to ensure a measurement in a desired direction is spite of disturbing echoes.

Figure 4:
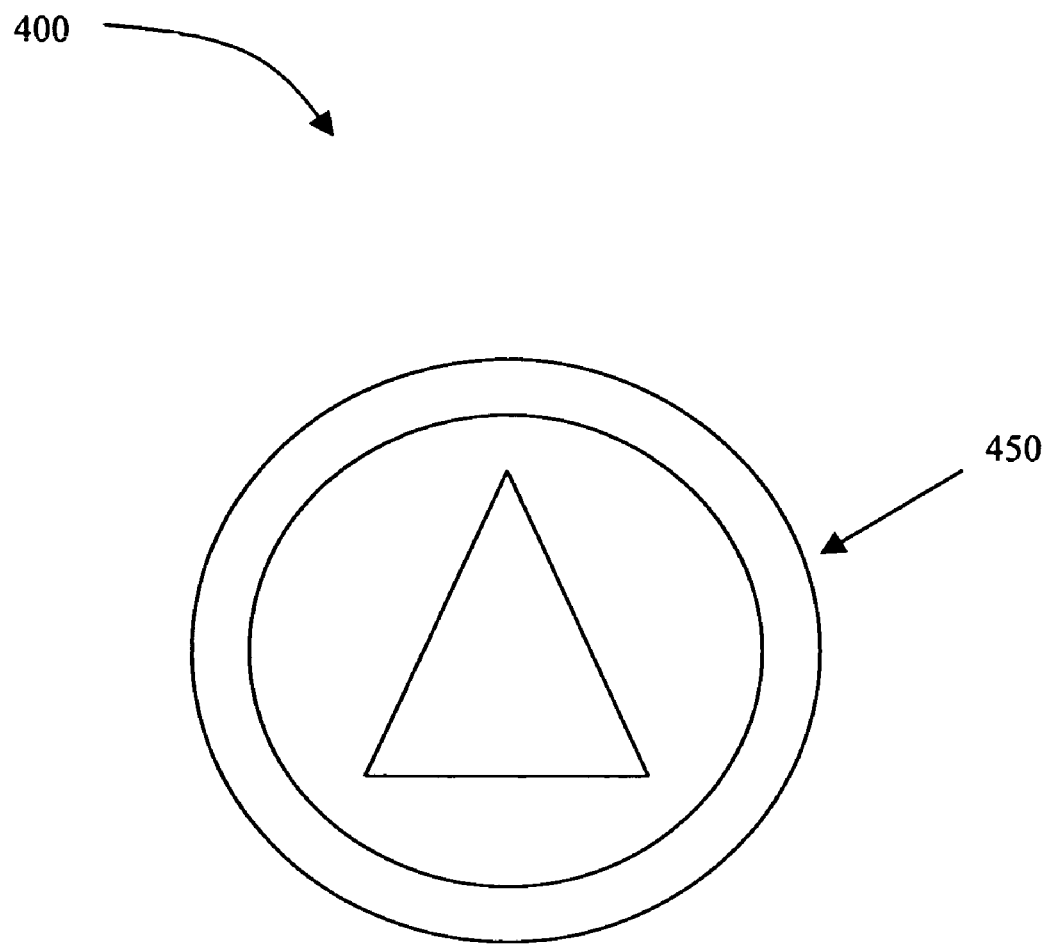

In FIG. 4, another embodiment 400 of the invention is shown, in the same "bottom view" as FIG. 3: The device 400 comprises only one additional reflector 450, which however is annular in shape, and arranged so as to have the rest of the device 400 in its centre.

In yet a further embodiment of the invention, a device which comprises more than one additional reflector can be designed so that each reflector introduces "individual" alterations to signals which have are reflected from them. Thus, in a device with, for example, two additional reflectors, each of the reflectors might introduce different modulation shifts, or different polarization shifts, so that the receiver can differentiate between the signals received.

Figure 5A:
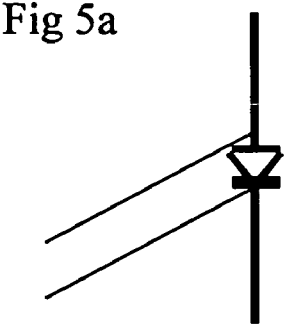
FIG. 5 shows details of the additional reflector
Figure 5B:
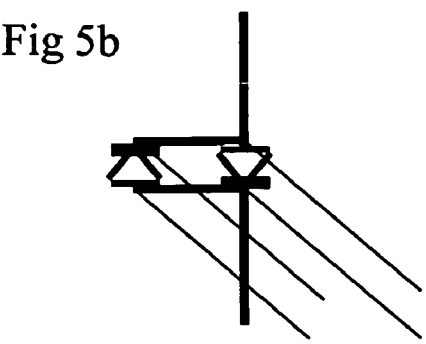
Figure 5C:
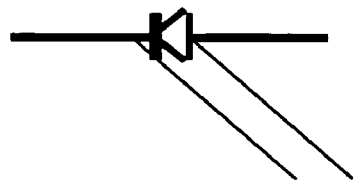

FIG. 5 is an example of details in the design of an additional reflector with an array of λ/2-dipoles or other antenna elements. Over each dipole there is a diode which by the control voltage can be either conducting (closed) or open (FIG. 5a). With a closed diode the dipole acts as a reflector when it is tuned to the used frequency (or a 10-20% frequency band) and with an open diode it is not active. Each dipole can be connected to a short circuit via a very short line and in this case the phase of the reflection can be controlled and it is also possible to have more than one diode to get more than two states of the reflection (FIG. 5b). In this case also capacitors to allow modulation voltage with maintained microwave short circuit are necessary but not shown in FIG. 5b. Different line length give different phases and all kind of standard modulations can be obtained. All dipoles may have the same direction (linear polarization) or they may be arranged for circular polarization or arranged for two different polarizations (FIG. 5c). Even if it would be more complicated delay lines could be connected to each dipole (or other antenna element) to create a distinctive feature from other echoes. Diodes is a likely switching element (either as switches or as variable capacitors) but MEMS elements (electrically controlled switches made in IC-shape) are other candidates. A fairly simple modulation (phase or amplitude) is assumed above but for instance a frequency shift can also be done by rather simple means either in the shape of a mixer or by a multi-step phase shifter (such as 0°, 120° and 240° phase shift).

An embodiment with a plurality of additional reflectors, each of which introduces its own signal alteration could in a way be said to give rise to the same effect as a phased array antenna with a number of optional beams, but without the complicated feed arrangement usually necessary to obtain such antennas. The control signals will have rather low frequencies (in the kHz-MHz range) giving a simple wiring of standard type and the microwave related parts typically are printed dipoles (for instance λ/2-dipoles) with diodes controlled by the control signals (conducting diode enables λ/2-function but not an open diode). As in conventional antenna technology the printed dipoles may be supported by some metal structure (reflecting on the back-side and direction on the front-side by a plate, a cluster of horns etc.)

The additional reflector can introduce some kind of modulation as described above but in the principle also includes change of polarization by fully passive means which can be used to make the reflection via the additional reflector to dominate over the other reflections. If for instance two different linear polarizations are used for transmitting and receiving a mechanical arrangement (incl. antenna) having XY-symmetry will give a very weak reflected signal from a smooth surface but a reflector which turns the polarization 90° (such as a well known 45°-grid) will make the signal easy to receive after the double transitions and also easy to distinguish from the antenna echo. The limited resolution range at a narrow bandwidth will otherwise make a surface echo hard to distinguish from the antenna echo but this will be improved both by the increased distance (×2) and by the polarization suppression of the antenna echo.

It should be mentioned that in an embodiment where each additional reflector introduces individual signal alterations, it is not of primary importance to place all of the additional reflectors at the same height from the surface, since the reflected signals can be distinguished from each other by other means.

An obvious alternative to the embodiment where each antenna introduces its alteration to the reflected signals is to have groups of additional reflectors, where each group has its "own" signal alteration.

Although the invention can be applied to RLG at virtually any frequency band, those frequency bands which at present seem the most viable are the so called ISM-bands (Industrial, Scientific and Medical) in the 1-40 GHz range. These bands are 2.4-2.5 GHz, 5.725-5.875 GHz and 24.0-24.25 GHz. In some countries also 61-61.5 GHz is an ISM-band.

The additional reflector can be designed in a large variety of ways which will be known to those skilled in the field, but some examples which can be mentioned are dipoles with a diode, or a helix which protrudes from a PCB with a modulation device. On the microwave side the reflector has similarities with a conventional array antenna but there is no microwave distribution network which greatly simplify the design. The control signal is of a rather low frequency and is distributed by standard printed circuit lines.

What is claimed is:
1. A device for using radar signals to measure the distance (h) to a surface from said device, the device comprising:

a transmitter and a transmitting antenna for transmitting radar signals, a receiver and a receiving antenna for receiving radar signals, a first reflector designed so as to introduce a first predetermined alteration in radar signals upon reflection said reflector located such that signals transmitted from said transmitter reflected by said surface are reflected by said reflector prior to receipt by said receiving antenna, means to differ between received signals with and without said predetermined alteration, and a processing unit for measuring the distance to the surface from said device based upon signals with said predetermined alteration and signals without said predetermined alteration.

2. The device of claim 1, in which said first reflector allows signals transmitted from said transmitter to be reflected multiple times by said surface before being received by said receiving antenna.

3. The device of claim 1, in which said first reflector is geometrically separated from the receiving antenna.

4. The device of claim 1, in which the first predetermined alteration introduced by the first reflector is a modulation shift.

5. The device of claim 4, wherein said modulation shift belongs to the group of amplitude modulation shift and phase modulation shift.

6. The device of claim 1, in which the first predetermined alteration introduced by the first reflector is a shift in the polarization of the signal.

7. The device of claim 1, in which the first predetermined alteration introduced by the first separate reflector is a modulation of the radar signals by means of mechanical movement in the first reflector.

8. The device of claim 1, comprising at least a second reflector, which second reflector is designed so as to introduce a second predetermined alteration in radar signals upon reflection, said second alteration differing from the first alteration, the device being equipped with means to differ between received signals with said first and second predetermined alterations.

9. The device of claim 8, in which said second reflector is geometrically separate from the receiving antenna.

10. The device of claim 8, in which the predetermined alteration introduced by the second reflector is a modulation shift.

11. The device of claim 10, wherein said modulation shift belongs to the group of amplitude modulation shift and phase modulation shift.

12. The device of claim 8, in which the predetermined alteration introduced by the second reflector is a shift in the polarization of the signal.

13. The device of claim 1, further adapted for measuring the level of a substance in an environment which is electromagnetically open to the ambient atmosphere.

14. A device according to claim 1, wherein said reflector is located reflect signals, which have been transmitted from said transmitter and reflected by said surface, back towards said surface, enabling said signals to be reflected again by said surface before being received by said receiving antenna.

15. A method for using radar signals to measure a distance (h) to a surface from a radar level measuring device, the method comprising:

transmitting radar signals towards said surface from a transmitting antenna, allowing said transmitted signals to be reflected by said surface, allowing said transmitted signals to be reflected by a first reflector after being reflected by said surface, said first reflector introduces a first predetermined alteration in said radar signals upon reflection, receiving reflected radar signals at a receiving antenna after being reflected by said reflector, differing between received signals with and without said predetermined alteration, and determining said distance bases on a relation between the transmitted and the received radar signals.

16. The method of claim 15, further comprising allowing signals transmitted from said transmitter to be reflected multiple times by said surface before being received by said receiving antenna.

17. The method of claim 15, according to which the first predetermined alteration introduced by the first reflector is a modulation shift.

18. The method of claim 17, wherein said modulation shift belongs to the group of amplitude modulation shift and phase modulation shift.

19. The method of claim 15, according to which the first predetermined alteration introduced by the first reflector is a shift in the polarization of the signal.

20. The method of claim 15, also comprising:

allowing said transmitted signals to be reflected by a second reflector, said second reflector introduces a second predetermined alteration in said radar signals upon reflection, differing between received signals with said first and second predetermined shifts.

21. The method of claim 20, according to which the predetermined alteration introduced by the second reflector is a modulation shift.

22. The method of claim 21, wherein said modulation shift belongs to the group of amplitude modulation shift and phase modulation shift.

23. The method of claim 21, according to which the predetermined alteration introduced by the second reflector is a shift in the polarization of the signal.

24. The method of to claim 15, wherein frequencies of the transmitted radar signals are within one of the ISM bands 2.4-2.5 GHz, 5.725-8.875 GHz, 24.0-24-25 GHz and 61-61.5 GHz.

25. A device comprising:

a transmitter and a transmitting antenna for transmitting radar signals, a receiver and a receiving antenna for receiving radar signals, a first reflector designed so as to introduce a first predetermined alteration in radar signals upon reflection, said reflector allowing signals transmitted from said transmitter to be reflected by said surface and said reflector before being received by said receiving antenna, and means to differ between received signals with and without said predetermined alteration.

26. The device of claim 25, in which said first reflector allows signals transmitted from said transmitter to be reflected multiple times by said surface before being received by said receiving antenna.

* * * * *

UNITED STATES PATENT AND TRADEMARK OFFICE
CERTIFICATE OF CORRECTION

| | |
|---|---|
| PATENT NO. | : 7,486,226 B2 |
| APPLICATION NO. | : 11/516845 |
| DATED | : February 3, 2009 |
| INVENTOR(S) | : Olov Edvardsson |

It is certified that error appears in the above-identified patent and that said Letters Patent is hereby corrected as shown below:

Col. 7, line 7, change "said transmitter reflected by said surface" to -- said transmitter and reflected by said surface --.

Col. 7, line 56, change "located reflect signals," to -- located to reflect signals, --.

Signed and Sealed this

Nineteenth Day of May, 2009

JOHN DOLL
*Acting Director of the United States Patent and Trademark Office*